United States Patent [19]

McCabe

[11] 4,241,748
[45] Dec. 30, 1980

[54] BUTTERFLY SMOKE/FIRE DAMPER

[75] Inventor: Francis J. McCabe, Doylestown, Pa.

[73] Assignee: Prefco Products, Inc., Buckingham, Pa.

[21] Appl. No.: 947,104

[22] Filed: Sep. 29, 1978

Related U.S. Application Data

[63] Continuation-in-part of Ser. No. 792,525, May 2, 1977, Pat. No. 4,146,048.

[51] Int. Cl.$^3$ .................. F16K 17/38; F16K 31/04; E05F 15/20
[52] U.S. Cl. .................................. 137/77; 98/86; 160/1; 251/212; 251/294
[58] Field of Search ............... 137/601, 77; 251/212, 251/294; 126/286, 287.5, 296; 98/1, 86; 160/1

[56] References Cited

U.S. PATENT DOCUMENTS

| 2,148,530 | 2/1939 | Burke | 126/287.5 X |
|---|---|---|---|
| 3,009,473 | 11/1961 | Hennen | 251/212 X |
| 3,273,632 | 9/1966 | McCabe | 160/1 |
| 3,327,764 | 6/1967 | McCabe | 160/5 |
| 3,401,734 | 9/1968 | McCabe | 160/207 |
| 3,725,972 | 4/1973 | McCabe | 16/48.5 |
| 3,727,663 | 4/1973 | McCabe | 160/1 X |
| 3,814,165 | 6/1974 | McCabe | 160/207 |
| 3,866,656 | 2/1975 | McCabe | 160/1 X |
| 3,866,657 | 2/1975 | McCabe | 160/207 X |
| 3,899,156 | 8/1975 | McCabe | 137/75 X |
| 4,146,048 | 3/1979 | McCabe | 137/75 |

FOREIGN PATENT DOCUMENTS 183592  5/1963  Sweden .................. 251/212

Primary Examiner—Martin P. Schwadron
Assistant Examiner—Richard Gerard
Attorney, Agent, or Firm—Benasutti Associates, Ltd.

[57] ABSTRACT

A pair of butterfly smoke/fire dampers are mounted on a single frame. Each damper includes a pair of blades which can be locked in the open position and which, when released, rotate about a hinge to the closed position. The frame has a flange around the inner periphery thereof which engages the edges of the blades in the closed position. Each pair of blades are moved to the open position by an operator cable which extends through a first ferrule in the frame, through a second ferrule in one of the blades and thereafter across the blades to a point of attachment complementally located on the opposing blade. The frame ferrule is offset from the blade ferrule whereby withdrawing the cable causes both blades to be drawn toward each other. The blades can be held in the open position by maintaining tension on the operator cable or by a fusible link or other heat responsive latching mechanisms.

19 Claims, 8 Drawing Figures

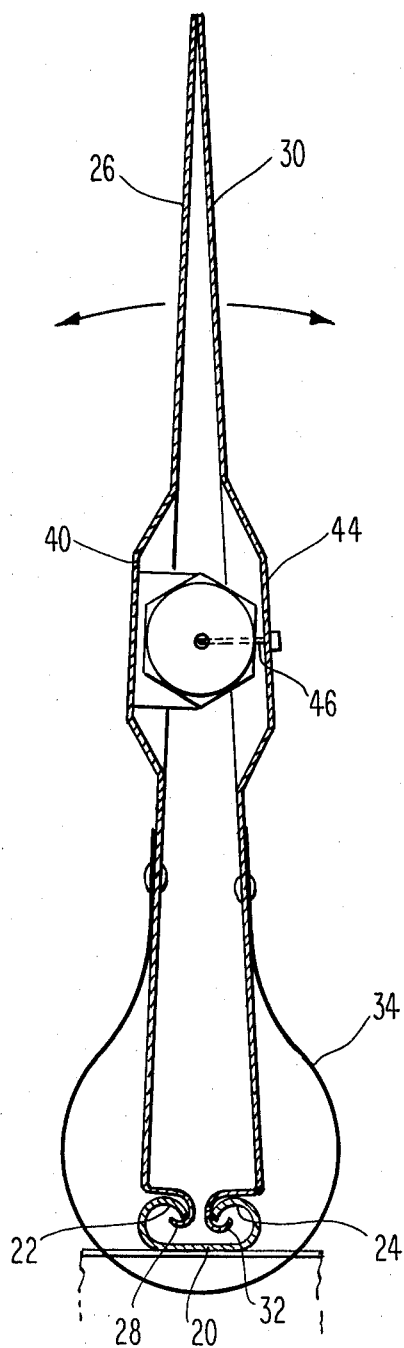
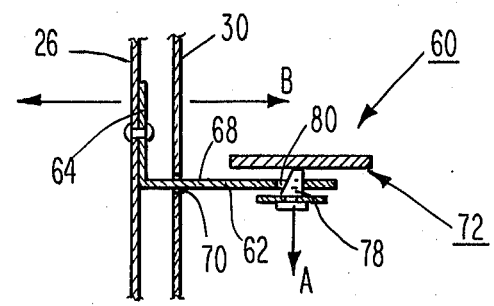
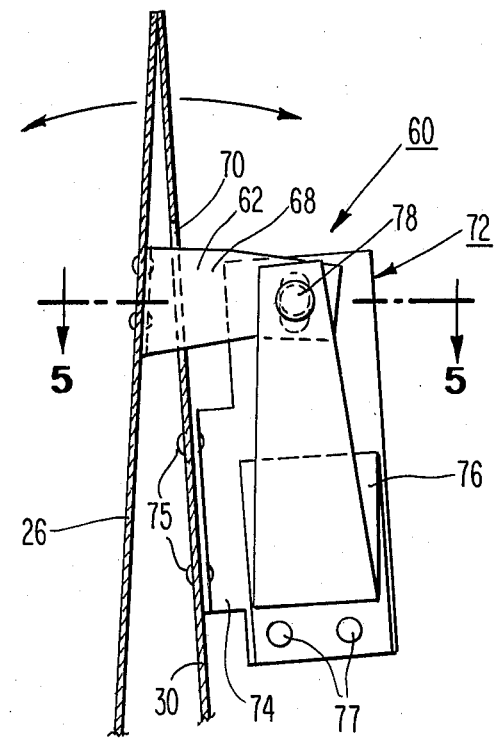
Fig. 3
Fig. 5
Fig. 4

BUTTERFLY SMOKE/FIRE DAMPER

CROSS REFERENCE TO RELATED APPLICATIONS

This application is a continuation-in-part of my prior U.S. Patent Application, Ser. No. 792,525, filed May 2, 1977, now U.S. Pat. No. 4,146,048, entitled "BUTTERFLY DAMPER", which application is incorporated by reference as if fully set forth herein.

BACKGROUND OF THE INVENTION

This invention relates to smoke/fire dampers and particularly to butterfly type dampers for use in air ducts.

It is important that a smoke/fire control damper by capable of withstanding intense heat and/or air pressures which impinge on either side of the damper for substantial periods of time during a fire. Due to the extreme conditions to which such a damper is subjected, it is necessary to provide a fire capable blade and frame design which together form a tight positive seal to effectively shut off the air duct, opening or plenum.

In fact, due to this deficiency experienced by some practitioners in this field, folding blade fire dampers such as those illustrated in my previously issued U.S. Pat. Nos. 3,866,656; 3,866,657; 3,814,165; 3,401,734; 3,727,663; 3,327,764; and 3,273,632 have been utilized in order to overcome those deficiencies otherwise encountered by some devices utilizing a plurality of rotating blades, each of which blades must form a seal with an adjacent blade as well as the frame, which seal is sometimes prone to leakage in the event that extremely precise alignments and tolerances are not maintained. This problem has been aggravated by the fact that smoke and fire dampers must function effectively in a relatively dirty environment years after they have been installed.

Prior art rotating blades fire and smoke dampers have, therefore, incorporated extremely heavy materials which are not subject to easy bending or deformation in the presence of heat. The blades are mounted by distinct hinge or pivot means which are separately installed for the purposes of aligning each of the blades for rotational movement and to ensure the interengagement of each blade with its adjacent blade to form a seal therebetween which does not open in the presence of heat or excessive pressures, such as those which might be encountered during a fire.

It is sometimes desirable to provide dampers with springs for forcing the blades of a folding blade or a single blade damper to the closed position. My previously issued U.S. Pat. Nos. 3,899,156; 3,866,657; 3,814,165; and 3,401,734, illustrate various uses of springs in this regard. Spring closure devices when they used, are normally mounted at one end of the frame to pull curtain-type folding blade closures thereacross; or on one side of a single blade to cause that blade to engage a locking clip to lock it in the closed position. Springs have not generally been used (in the absence of the locking device) to directly restrain the devices against fire since heat will tend to cause the spring to lose its strength, and thus its effectiveness.

SUMMARY OF THE INVENTION

A double butterfly smoke/fire damper is disclosed for use in air ducts. On functioning as a fire damper, the blades remain in an open position under normal conditions, However, in the event of fire, the damper permits both sets of blades to automatically snap shut to thereby prevent the spread of fire through the duct. Because fire dampers may sit for years in a duct without a fire occurring, accumulating dirt and grease in the duct, hinges and blades, etc., a damper design is needed that will ensure quick and reliable operation during the one time or so that a fire occurs. The novel butterfly damper disclosed herein accomplishes this through the interplay of several unique features. The damper disclosed herein comprises a pair of complemental butterfly dampers. In the preferred embodiment of each butterfly damper, at least two blades engage a cross bar comprising two hinge elements which extend along the entire length of the cross bar to bridge the duct opening. The cross bar is attached on each end to a damper frame or flange or directly to the duct walls. In the open position, the blades of each butterfly damper are substantially parallel to one another and to the direction of flow of the air through the duct whereby the thin blade edges are streamlined into the air flow to minimize resistance to air flow through the duct.

The blade of each butterfly damper are held in the open position by an operator cable which extends through a first ferrule in the frame, through a second ferrule in one of the blades and thereafter across the blades to a point of attachment complementally located on the opposing blade. The frame ferrule is offset from the blade ferrule whereby withdrawing the cable causes both blades to be drawn toward each other to the open position. Blades can be held in the open position by maintaining tension on the operator cable or by linkage means which are located entirely on the blades. Spring means are used to bias the blades in the closed position. Consequently, in one embodiment cable tension is released thereby permitting the spring biased blades to move from the open to the closed position. In another embodiment, when the surrounding environment reaches a predetermined temperature, a fusible link releases thereby allowing the spring biased blades to move from the open position to the closed position.

Various means can be employed to stop the rotation of the blades when they have reached the closed position. For example, in the preferred embodiment, an inwardly depending flange is attached to or made part of the damper frame which is configured to match the shape of the duct. Easily releasable locking spring clips can be mounted on or adjacent the flange to hold the blades in the closed position until the fire danger is over after which the blades can be reset to the open position.

It is desirable to prevent not only the fire but also the high temperature that accompanies a fire from being conducted to the other side of the duct when the butterfly dampers are in the closed position. Each butterfly blade configuration provides a solid single plane barrier for maximum security against radiation and convection heat transfer. In addition, insulation material can be placed directly on the surfaces of the blade without interfering with the configuration of the damper, air flow through the duct, or the snap-action of the blades. Also, the air which is trapped between the two closed butterfly dampers provides additional insulation from one side to the other.

In addition to all of the above functions, the preferred embodiment double butterfly damper of this invention can function with a volume control damper operator to regulate the flow of air through the duct and to function as a smoke damper through use with smoke dectectors, etc.

The simplified design provides a method for easy construction and low cost production of the preferred embodiment double butterfly damper for use in round or square ducts. A sleeve or frame is provided having a configuration of the duct with which the damper is to be used, the frame having an inwardly depending flange to coact with the damper blades to form a seal. The frame is preferably formed from one piece of material which is bent into the desired configuration to be riveted or otherwise fastened together at a single point. The material is preferably grooved in order to form the flange which bisects the damper pair. The blade and hinge portion of each complemental butterfly damper is preassembled prior to its introduction into the frame and comprises at least two blades, each of which has along one of the edges thereof a hook-shaped hinge portion. A cross bar comprises two integral hook-shaped hinge elements which are complementally configured to the hinge portions of the blades, the cross bar having a dimension slightly smaller than the inside dimension of the frame.

The blade and hinge portion of each butterfly damper is formed by threading each of the hook-shaped hinged portions of the blades into the appropriate hook-shaped hinge element on the cross bar, whereupon the blade and hinge portion and particularly, the cross bar portion thereof is placed within the frame. Cross bar portions of the complemental butterfly dampers are preferably aligned one to the other.

Hold down brackets are slipped over the ends of each cross bar to hold the cross bar against the bisecting flange. In the preferred embodiment, these hold down brackets are preferably oriented within the frame so that the innerconnection of the two ends of the material forming the frame will be made at one of those brackets so that the riveting or other means of innerconnection of the brackets to this frame will further act to reinforce the connection between the ends of the frame, thereby reducing the labor required to construct the damper. This fabrication technique permits the novel double butterfly damper to be assembled wherein the only welding or riveting which must be accomplished to complete the assembly of the hinged blades in the frame is that which is performed in attaching the hold down brackets to the adjacent portions of the frame. The damper is then easily adapted to receive springs, triggering devices, linkages or whatever peripheral equipment may be desired to operate same.

Accordingly, it is an object of the present invention to provide a double butterfly smoke/fire damper having a novel linkage means attached to the blades for rotating the blades to the open position and maintaining the blades in this position.

It is another object of the present invention to provide minimum resistance to air flow through the duct with the blades in the open position.

It is another object of the present invention to provide a smoke/fire damper which forms a positive seal in either direction of air flow within the duct.

It is another object of the present invention to provide a double butterfly smoke/fire damper with novel rotation means for rotating the blades about the cross bars of the damper.

It is another object of the present invention to provide a butterfly fire damper with superior heat insulation characteristics when the blades are in the closed position.

It is another object of the present invention to provide a method of simplifying the fabrication of a double butterfly smoke-fire damper.

This and other objects of my invention will become apparent from the following description with reference to the accompanying drawings.

BRIEF DESCRIPTION OF THE DRAWINGS

FIG. 3 is a greatly enlarged cross section of one pair of blades in the open position.

FIG. 4 is a greatly enlarged cross-section of one embodiment of a blade locking means used with the butterfly damper of the present invention.

FIG. 5 is a cross-section taken along lines 5—5 of FIG. 4.

DETAILED DESCRIPTION OF THE DRAWINGS

Figure 1:
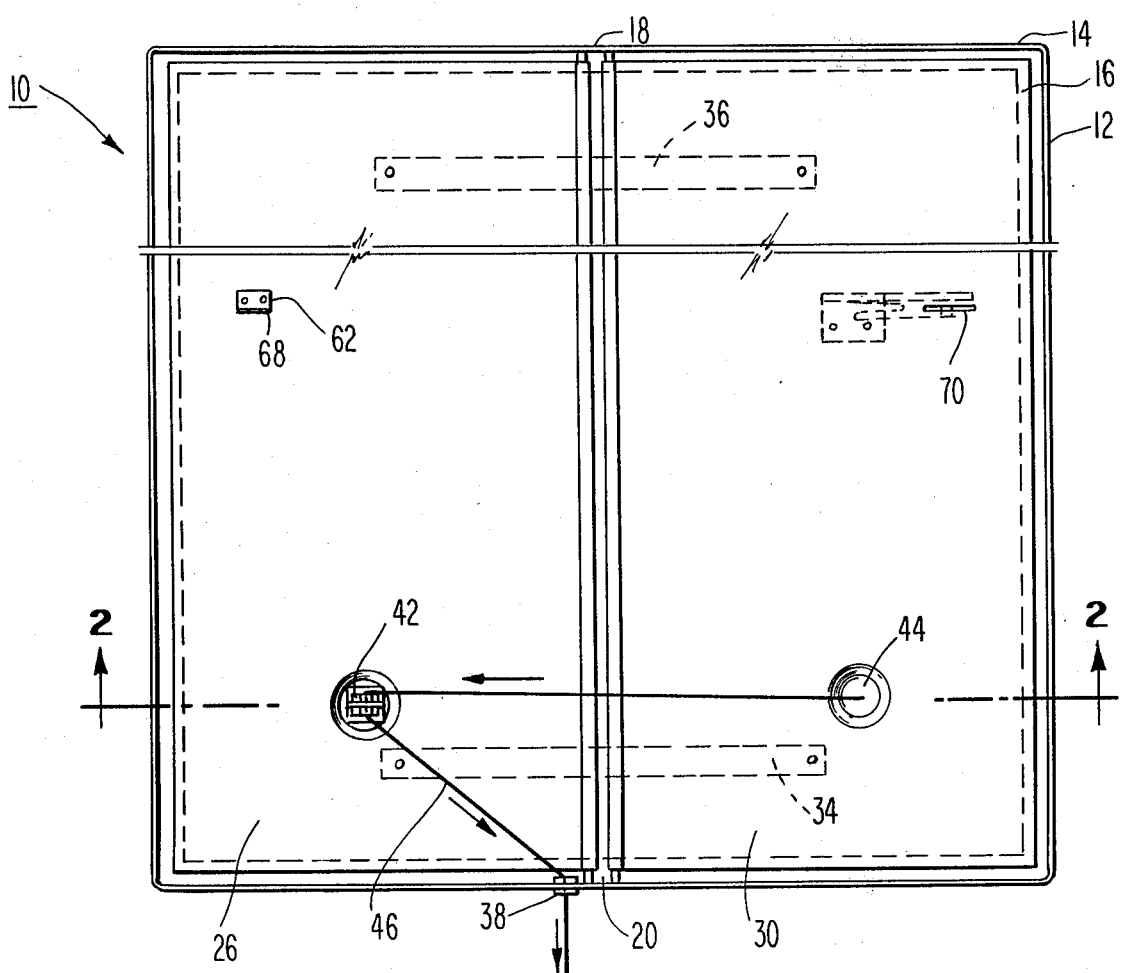
FIG. 1 is a plan view of the embodiment of the butterfly smoke/fire damper of the present invention, for use with ducts having a rectangular cross section and showing a manual version of the novel operator cable linkage means of the present invention.

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1, there is shown a preferred embodiment of a butterfly damper designated generally 10. Although the damper 10 is shown as rectangular for use with ducts having a rectangular cross-section, it should be noted that the damper may also be circular for use in ducts having a circular cross section and this alternate form is considered to be within the scope of my invention. The butterfly damper 10 includes a frame 12 having a wall 14 with an inwardly depending flange 16 (see FIG. 2). The frame 12 is preferably made of a single piece of material bent at the corners, and preferably welded at point 18. As previously mentioned it is of course not necessary that the damper frame be rectangular in cross section since it can be formed to fit any shape duct, such as duct with a circular cross section. A cross bar 20 extends across the frame 12 and lies on the inwardly depending flange 16. The cross bar 20 is securely fastened to the frame 12 by suitable means such as welding or riveting. The longitudinal edges of the cross bar 20 are curled inward to form a first 22 and a second 25 hinge hook. A first damper blade 26 having a hooked edge 28 is attached to the cross bar 20 with the hooked edge 28 engaging the first hinge hook 22. A second damper blade 30, having a hooked edge 32 is attached to the cross bar 20 with the hooked edge 32 engaging the second hinge hook 24. The hooked edge of each damper blade rotatably engages the corresponding hinge hook of the cross bar 20.

A first 34 and a second 36 closure springs are attached to one surface of the damper blades 26 and 30, by suitable attachment means, for example riveting or welding. These closure springs bias the damper blades against the flange portion 16 in the closed position as shown in FIG. 1.

The wall portion 14 of the frame 12 includes an aperture having a frame ferrule 38 therein. The first damper blade 26 contains a depression 40 which is offset from the frame ferrule 38. A blade ferrule 42 is mounted in the depression 40 by suitable means such as welding. The second blade 30 contains a depression 44 therein. The depression 44 is complementally positioned with respect to the depression 40 such that they are in substantial alignment when the first and second blades are rotated to the open position shown in FIG. 3 and in phantom in FIG. 2.

Figure 6:
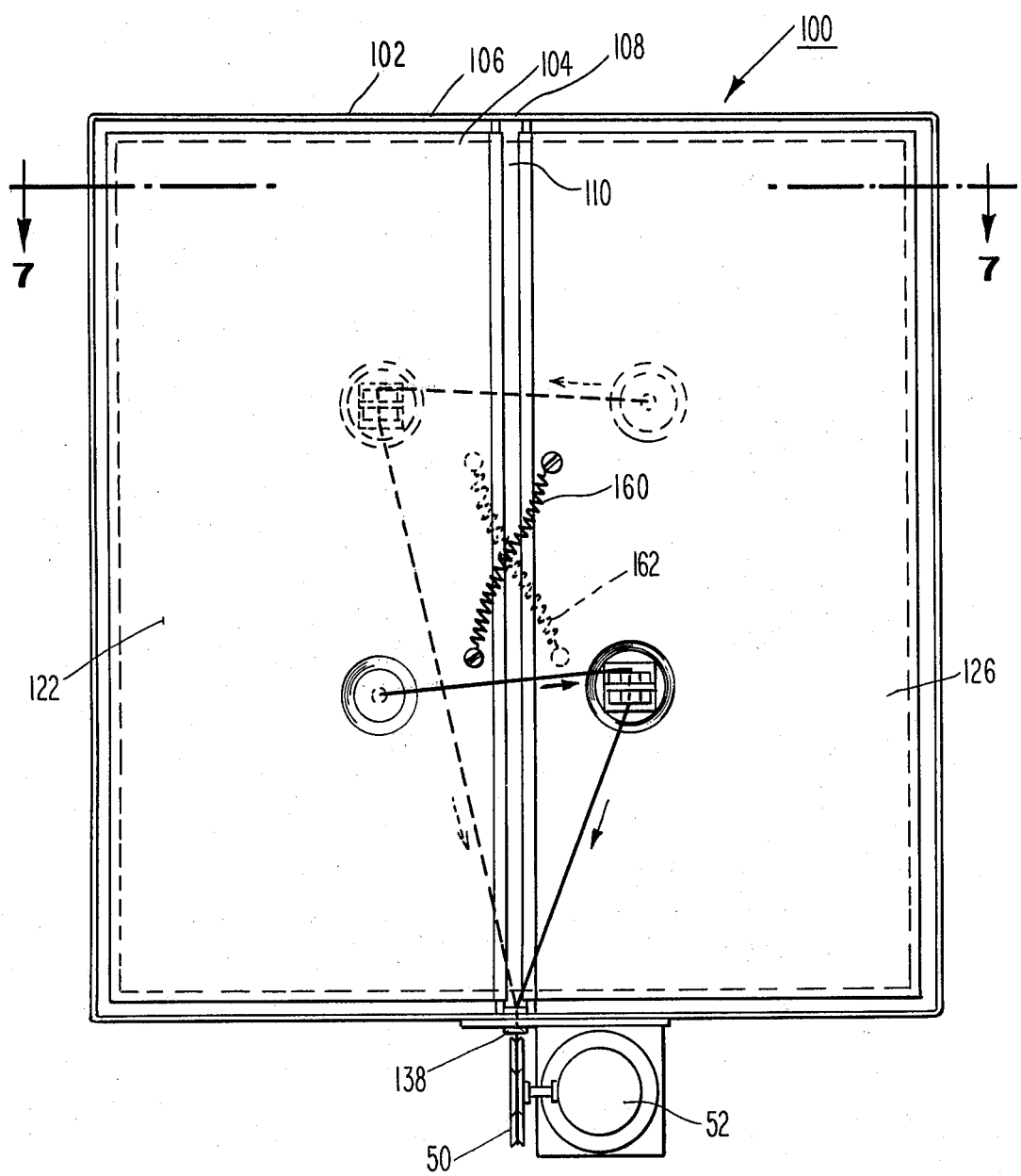
FIG. 6 is a plan view of one embodiment of the double butterfly smoke/fire damper of the present invention showing a motor operator means for opening the blades of both pairs of butterfly dampers.
Figure 7:
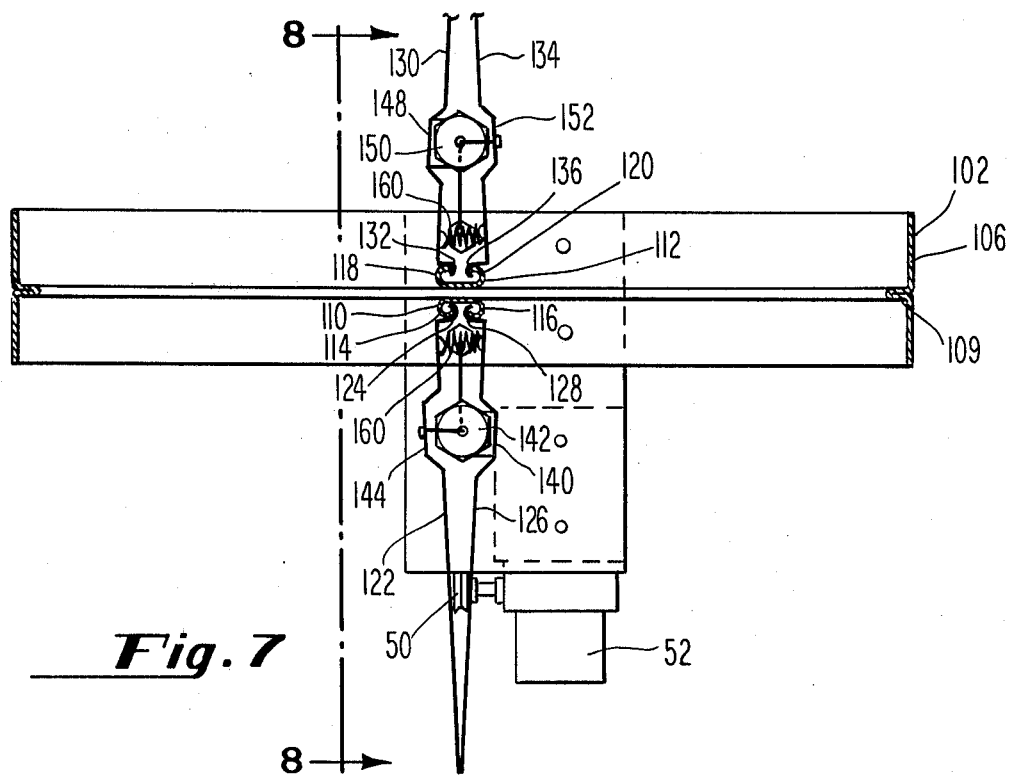
FIG. 7 is a cross-section taken along lines 7—7 of FIG. 6.
Figure 8:
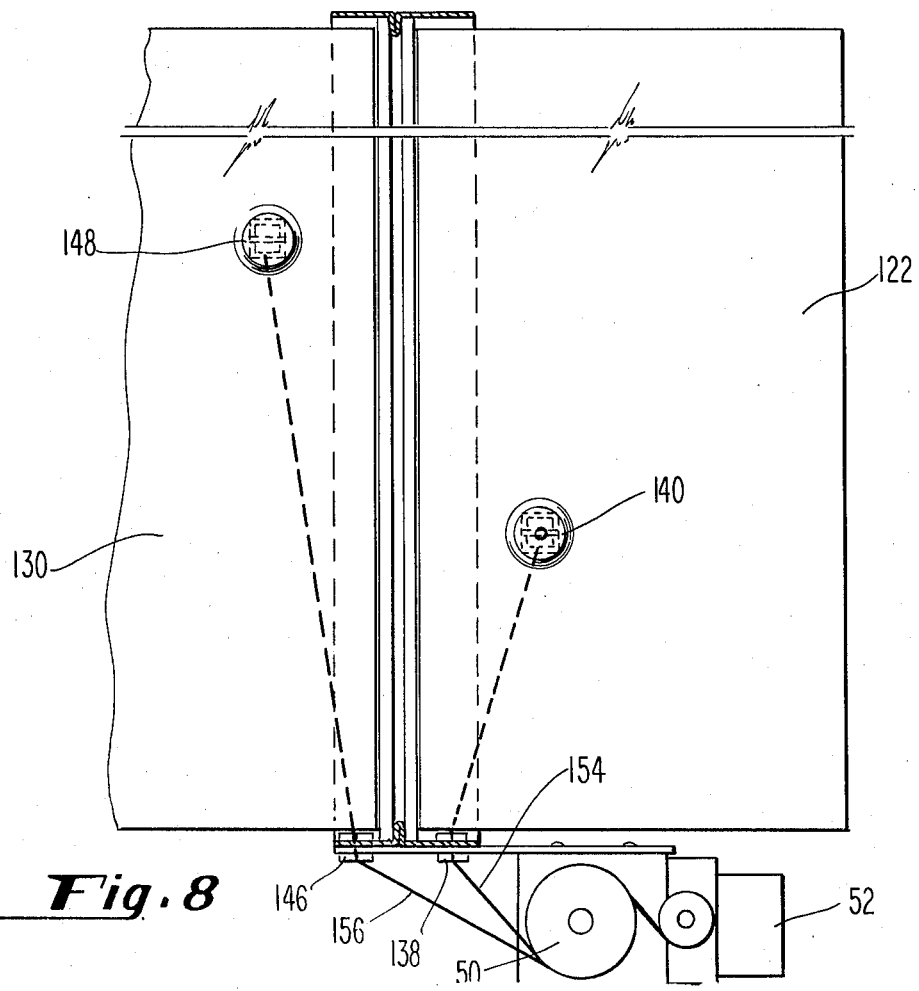
FIG. 8 is a cross-section taken along lines 8—8 of FIG. 7.

An operator cable 46 extends through the frame ferrule 38, the blade ferrule 42, and the end thereof is attached to the second blade 30 in the depression 44 thereon. The operator cable 46 can be terminated by a handle 48, as shown in FIG. 1, or alternatively could be wrapped around a pulley 50 which is driven by a motor operator 52 as shown in FIGS. 6, 7 and 8.

As shown in FIGS. 1, 2, 4 and 5, a linkage means, designated generally 60, provides, in one embodiment of the present invention, a means for restraining the blades 26 and 30, in the open position during normal conditions and releasing the blades when the temperature of the atmosphere passing through the blades exceeds a predetermined level. A pawl member 62 is attached by suitable means, for example rivets, to the inside surface of the first damper blade 26, the inside surface being that surface which faces the substantially parallel second blade 30 when the blades are in the open position. The portion of the pawl member 62 fastened to the first blade 26 is a portion which is substantially planar and parallel to the first blade 26 and is denoted 64 (see FIG. 5). Substantially perpendicular to the portion 64 is a portion 68 which extends away from the first blade 26 towards the second blade 30. The second damper blade 30 has an aperture 70 therein through which the portion 68 of the pawl member 62 extends when the blades are in the open position. A mounting member designated generally 72, receives the pawl member portion 68 and retains it therein to hold the blades in the open position. The mounting member 72 is attached to the outside surface of the second blade 30 by a bracket 74 which is fastened to the second blade 30 by suitable means such as rivets 75. A serpentine bimetallic link 76 is attached to the bracket 74 by a suitable means, for example rivets 77.

Figure 2:
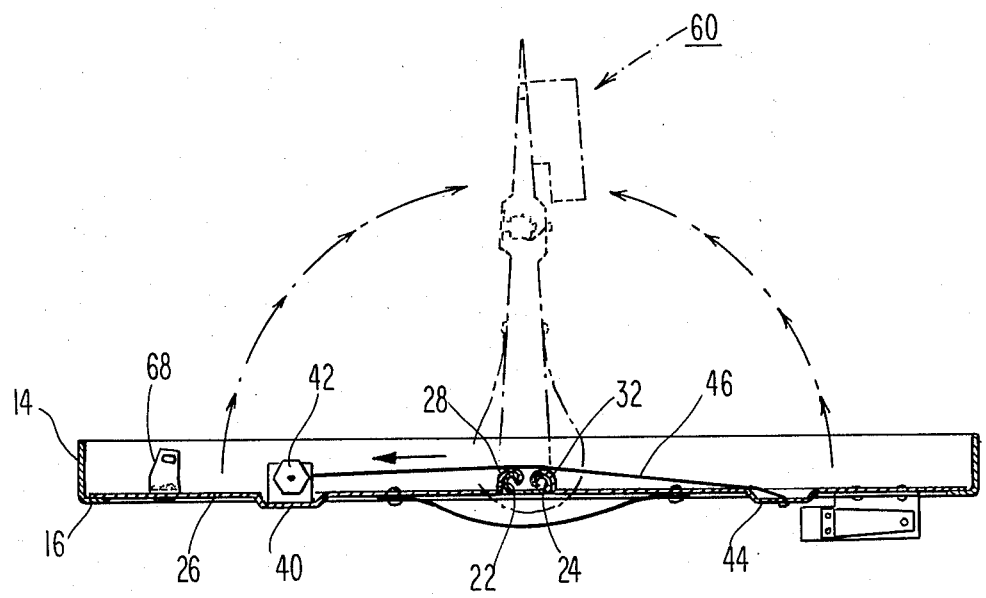
FIG. 2 is a cross section of FIG. 1 taken along lines 2—2 shown, in phantom, a pair of blades in an open position.

Once the butterfly smoke/fire damper 10 has been installed in a duct (not shown), the damper blades 26 and 30 are rotated to the open position, as shown in FIG. 3 and as shown in phantom in FIG. 2, by withdrawing the operator cable 46 in the direction shown by the arrows in FIG. 1. The offset location of the frame ferrule 38 with respect to the blade ferrule 42 causes the first damper blade 26 to begin to open, which in turn simultaneously causes the second damper blade 30, to which the operator cable 42 is attached, to similarly open. In the manual mode the operator cable 46 is withdrawing using the handle 48. In the remotely operated mode, the motor operator 52 is energized causing the pulley 50 to turn and wrap the operator cable 46 therearound. The operator cable 46 is withdrawn until the damper blades assume the open position as shown in FIG. 3 and, in phantom, in FIG. 2.

As the blades are being rotated to the open position, the pawl member portion 68 passes through the aperture 70 in the second blade 30. The end of the pawl member 62 engages a beveled portion of a pin 78 on the serpentine link 76, thereby displacing the serpentine link 76 in the direction shown by the arrow A in FIG. 5. The pawl 62 continues in the direction indicated by the arrow B in FIG. 5 until the pin 78 engages an aperture 80 in the pawl 62, thereby locking the damper blades 26 and 30 in the open position. As the temperature of the air surrounding the blades increases, the serpentine link 76 will expand and move in the direction indicated by the arrow A in FIG. 5. This expansion will continue until, at a predetermined temperature, the pin 78 has been completely withdrawn from the aperture 80 in the pawl 62 whereupon, the closure springs 34 and 36 will cause the damper blades 26 and 30 to rotate to the closed position as shown in FIGS. 1 and 2.

If desired, the blades could simply be held in the open position by maintaining tension on the operator cable 46. Such a configuration is illustrated in FIG. 3. Upon removal of the tension on the operator cable 46, the closure springs 34 and 36 will cause the damper blades 26 and 30 to rotate to the closed position. Tension can be removed, for example, by remotely enabling the motor operator to turn in the reverse direction thereby permitting the operator cable 46 to rewind off of the pulley 50 or by remote link release.

Referring to FIGS. 6, 7 and 8, there is shown a preferred embodiment of the double butterfly smoke/fire damper of the present invention, generally referred to as 100. The double butterfly smoke/fire damper 100 comprises a frame member 102 having a flange 104 which is inwardly depending from a wall 106. In the preferred embodiment, the flange 104 is formed by creasing the wall 106 substantially in the middle thereof. It should be noted that although the damper 100 is shown as being rectangular in FIG. 6 for use with ducts having a rectangular cross section, the damper frame may also be circular for use in ducts having a circular cross section, this alternate form being considered within the scope of my invention.

The frame 102 is preferably made of a single piece of material bent at the corners, and preferably welded at a point 108.

A first cross bar 110 extends across the frame 102 and lies on the inwardly depending flange 104. A second cross bar 112 also extends across the frame 102, preferably aligned with the first cross bar 110, and lies on the other side of the inwardly depending flange 104. The first 110 and second 112 cross bars are securely fastened to the frame 102 by suitable means such as welding or riveting. The longitudinal edges of each cross bar are curled inward to form a first 114 and a second 116 hinge hook on the first cross bar 110 and a first 118 and a second 120 hinge hook on the second cross bar 120. A first damper blade 122 having a hooked edge 124 is attached to the first cross bar 110 with the hooked edge 124 engaging the first hinge hook 114 thereof. A second damper blade 126 having a hooked edge 128 is attached to the first cross bar 110 with a hooked edge 128 engaging the second hinge hook 116 thereof. A third damper blade 130 having a hooked edge 132 is attached to the second cross bar 112 with a hooked edge 132 engaging the first hinge hook 118 thereof. A fourth damper blade 134, having a hooked edge 136, is attached to the second cross bar 112 with the hooked edge 136 engaging the second hinge hook 120 thereof. The hooked edge of each damper blade rotatably engages the corresponding hinge hook above the associated cross bar. As shown in FIGS. 6 and 7, closure springs 160 and 162 are attached to the first and second 126 damper blades, and the third 130 and fourth 134 damper blades respectively. These closure springs bias the respective pairs of blades against the flange portion 104 when the blades are in the closed position as shown in FIG. 6. Because of this feature, it can be appreciated that by using the double butterfly damper of the present invention, a very effective blade to flange seal will be formed regardless of the direction of air flow through the duct because the force exerted by the air flow itself will tend to further press the blades of the corresponding butterfly damper against the flange portion of the frame.

The wall portion 106 of the frame 102 includes a first aperture having a first frame ferrule 138 therein. The second damper blade 126 contains a depression 140 which is offset from the first frame ferrule 138. A first blade ferrule 142 is mounted in the depression 140 by suitable means such as welding. The first blade 122 contains a depression 144 therein. The depression 144 is complementally positioned with respect to the depression 140 such that they are in substantial alignment when the first 122 and second 126 blades are rotated to the open position as shown in FIG. 7. The wall portion 106 of the frame 102 includes a second aperture having a second frame ferrule 146 therein. The third damper blade 130 contains a depression 148 which is offset from the second frame ferrule 146. A second blade ferrule 150 is mounted in the depression 148 by suitable means such as welding. The fourth blade 134 contains a depression 152 therein. The depression 152 is complementally positioned with respect to the depression 148 such that they are in substantial alignment when the third 130 and fourth 134 blades are rotated to the open position as shown in FIG. 7.

A first operator cable 154 extends through the first frame ferrule 138, the first blade ferrule 142, and the end thereof is attached to the second blade 126 through an aperture in the depression 140 thereof. The second operator cable 154 is wrapped around the pulley 50 which is driven by the motor operator 52. A second operator cable 156 extends through the second frame ferrule 146, the second blade ferrule 150, and the end thereof is attached to the fourth blade 134 through an aperture in the depression 152 thereof. The second operator cable 156 is also wrapped around the pulley 50 which as previously stated is driven by the motor operator 52.

As previously described with respect to the single butterfly damper, the blades can be maintained in the open position by maintaining tension on the operator cables or by providing each set of blades with linkage means as previously described in detail or other types of heat responsive linkage means which are well known in the art.

In addition, optional bimetal locking clips can be attached, by suitable means, to the frame 102 on either side of the flange 104 to assist in maintaining the blades in the closed position during periods of high temperatures. These locking clips may be of the type described in my co-pending application herein before referred to.

Once the double butterfly smoke/fire damper 100 has been installed in a duct (not shown), the two sets of damper blades, 122, 126 and 130, 134, are rotated to the open positions as shown in FIG. 7, by withdrawing the operator cables 154 and 156 in the directions shown by the arrows in FIG. 6. The offset locations of the frame ferrule 138 with respect to the blade ferrule 140 and the frame ferrule 146 with respect to the blade ferrule 148, causes each set of damper blades to open, in a manner previously described for the single set of damper blades. In the preferred embodiment, the motor operator 52 is energized causing the pulley 50 to turn and wind operator cables 154 and 156 therearound. The operator cables 154 and 156 are withdrawn until the damper blades assume the open position as shown in FIG. 7. As previously stated, the blades can be held in the open position by heat responsive linkage means or by maintaining tension on the operator cables 154 and 156. Upon release of the links or removal of the tension on the operator cables 154 and 156, the closure springs 160 and 162 associated with each set of blades 124, 128 and 130, 134 respectively will cause the blade to rotate to the closed position. If the optional bimetal lock clips are used, the lock clips will hold the blades in the closed position as long as the ambient temperature exceeds a predetermined level.

It can be seen in FIG. 7 that the streamlined profile of each set of blades in the open position minimizes resistance to air flowing through the duct. In addition, when the blades have rotated to the closed position, the damper presents an effective barrier to air flowing in either direction in the duct since the increased pressure caused by the air flow will tend to force the blades against the inwardly depending flange 104 thereby tending to create an even better seal. Due to the nature of the novel double butterfly design, this sealing effect works in both major air flow directions.

It will be understood that various changes in the details, materials and arrangement of parts which have been herein described and illustrated in order to explain the nature of this invention, may be made by those skilled in the art within the principle and scope of the invention as expressed in the following claims.

I claim:
1. A smoke/fire control damper for use in a duct, said damper comprising:
   a. a frame adapted for mating with an opening of said duct;
   b. a cross bar extending across said frame;
   c. at least two substantially planar damper blades which engage said cross bar for pivotal displacement about said cross bar between open and closed positions; and
   d. operating means for pivoting said blades between the open and closed positions, said operating means comprising:
      (i) a first operator cable guide means disposed in said frame;
      (ii) a second operator cable guide means attached to a first one of said damper blades in a location which is offset from said first operator cable guide means;
      (iii) an operator cable slidingly engaging said first and second operator cable guide means, one end of said operator cable being attached to an attachment point on a second one of said blades, said attachment point located substantially opposite said second operator cable guide means when said blades are in the open position; and
      (iv) means for exerting tension on said operator cable.

2. The invention of claim 1 wherein said cross bar includes a pair of integrally formed hook-shaped hinge elements along the longitudinal dimension thereof, each hook-shaped hinge element complementally engaging a hook-shaped longitudinal edge portion of a damper blade.

3. The invention of claim 2 wherein a first substantially planar surface of said first one of said damper blades faces a first substantially planar surface of said second one of said damper blades when said blades are in the open position, said first surface of said first damper blade having a depression therein in which said second operator cable guide means is mounted; and said first surface of said second damper blade having a depression therein in which said cable attachment point is disposed.

4. The invention of claim 3 wherein said first and second operator cable guide means each comprises a ferrule embracing at least a portion of said operator cable.

5. The invention of claim 4 wherein said frame comprises a wall portion having a flange inwardly depending therefrom.

6. The invention of claim 5 wherein said damper further comprises closure means for maintaining a force on said blades to move said blades towards said closed position, said closure means comprising at least one spring attached to a second surface opposite the first surface of each of said blades and arching around said cross bar, said spring exerting a force to move said blades away from one another, toward said closed position.

7. The invention of claim 6 wherein said damper further comprises linkage means for restraining the blades in the open position and for releasing the blades when the temperature of the atmosphere in said duct reaches a preselected temperature, said linkage means comprising:
 a. a mounting member attached on the second surface of the second damper blade, said second damper blade having an opening therein;
 b. a pawl member mounted on the first surface of said first damper blade and extending therefrom to pass through the opening in said second damper blade to engage said mounting member and be restrained thereby when said blades are in the open position; and
 c. a heat responsive means attached to said mounting member for releasing said pawl from said mounting member when the ambient temperature exceeds said preselected temperature.

8. The invention of claim 7 wherein said heat responsive means is a bimetallic link attached to said mounting member.

9. The invention of claim 8 wherein said means for exerting tension on said operator cable comprises a handle for manually withdrawing said operator cable through said ferrules.

10. The invention of claim 8 wherein said tension exerting means comprises a take-up pulley having one end of said operator cable attached thereto, said pulley being connected to a remotely operable motor for rotating said pulley in a first direction whereby said operator cable is wound around said pulley and in a second direction opposite said first direction whereby said operator cable is unwound from said pulley.

11. A smoke/fire control damper for use in a duct, said damper including a frame adapted for mating with an opening of said duct, said frame including a wall portion having a flange inwardly depending therefrom, said flange separating said damper into a first damper portion and a second damper portion, each damper portion comprising:
 a. a cross bar extending across said frame;
 b. at least two substantially planar damper blades which engage said cross bar for pivotal displacement about said cross bar between open and closed positions; and
 c. operating means for pivoting said blades between the open and closed position, said operating means comprising:
  (i) a first operator cable guide means disposed in said frame;
  (ii) a second operator cable guide means attached to a first one of said damper blades in a location which is offset from said first operator cable guide means;
  (iii) an operator cable slidingly engaging said first and second operator cable guide means, one end of said operator cable being attached to an attachment point on a second one of a said blades, said attachment point located substantially opposite said second operator cable guide means when said blades are in the open position; and
  (iv) means for exerting tension on said operator cable.

12. The invention of claim 11 wherein a first substantially planar surface of said first one of said damper blades in said first damper portion faces a first substantially planar surface of said second one of said damper blades in said first damper portion and a first substantially planar surface of said first one of said damper blades in said second damper portion faces a first substantially planar surface of said second one of said damper blades in said second damper portion when the blades of said damper portions are in the open position; and a second surface, opposite said first surface of said first damper blade of said first damper portion faces a second surface, opposite said first surface of said first damper blade of said second damper portion and a second surface opposite said first surface of said second damper blade of said first damper portion faces a second surface opposite said first surface of said second damper blade of said second damper portion when said blades of both damper portions are in the closed position.

13. The invention of claim 12 wherein at least a portion of said blades of said first and second damper portions engage said inwardly depending flange in the closed position.

14. The invention of claim 13 wherein said first surface of said first damper blade of said first damper portion includes a depression therein in which said second operator cable guide means is mounted, and said first surface of said second damper blade of said first damper portion includes a depression therein in which said cable attachment point is disposed; and said first surface of said first damper blade of said second damper portion includes a depression therein in which said second operator cable guide means is mounted and said first surface of said second damper blade of said second damper portion includes a depression therein in which said cable attachment point is disposed.

15. The invention of claim 14 wherein said first and second operator cable guide means of each of said first and second damper portions, each comprise a ferrule embracing at least a portion of said operator cable.

16. The invention of claim 15 wherein each of said first and second damper portions further comprise closure means for maintaining a force on said blades to move said blades towards said closed position, said closure means comprising at least one spring attached to said second surface of each of said blades and arching around said cross bar, said spring exerting a force to move said blades away from one another, towards said closed position.

17. The invention of claim 16 wherein each of said first and second damper portions further comprise heat responsive linkage means for restraining the blades in the open position and for releasing the blades when the temperature of the atmosphere in said duct reaches a preselected temperature.

18. The invention of claim 17 wherein said means for exerting tension on said operator cable of said first and second damper portions comprises a handle for manually withdrawing said operator cables through said embracing ferrules.

19. The invention of claim 17 wherein said tension exerting means comprises a take-up pulley having one end of each of said operator cables attached thereto, said pulley being connected to a remotely operable motor for rotating said pulley in a first direction whereby said operator cables are wound around said pulley and in a second direction opposite said first direction whereby said operator cables are unwound from said pulley.

* * * * *